US009055598B2

(12) United States Patent
Reudink

(10) Patent No.: US 9,055,598 B2
(45) Date of Patent: *Jun. 9, 2015

(54) SYSTEMS AND METHODS FOR MAKING CHANNEL ASSIGNMENTS TO REDUCE INTERFERENCE AND INCREASE CAPACITY OF WIRELESS NETWORKS

(71) Applicant: Microsoft Corporation, Redmond, WA (US)

(72) Inventor: Douglas O. Reudink, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

This patent is subject to a terminal disclaimer.

(21) Appl. No.: 13/714,206

(22) Filed: Dec. 13, 2012

(65) Prior Publication Data

US 2013/0170371 A1 Jul. 4, 2013

Related U.S. Application Data

(63) Continuation of application No. 13/197,151, filed on Aug. 3, 2011, which is a continuation of application No. 11/777,801, filed on Jul. 13, 2007, now Pat. No. 8,010,118, which is a continuation of application No. 11/172,604, filed on Jun. 30, 2005, now Pat. No. 7,257,376.

(51) Int. Cl.
*H04Q 7/38* (2006.01)
*H04Q 7/20* (2006.01)
(Continued)

(52) U.S. Cl.
CPC ............ *H04W 72/085* (2013.01); *H04W 16/10* (2013.01); *H04W 72/08* (2013.01)

(58) Field of Classification Search
CPC ... H04W 24/10; H04W 36/30; H04W 72/082; H04W 84/047; H04W 16/02; H04W 36/0061; H04W 52/0245; H04W 52/245; H04W 74/04
USPC .......... 455/63.1, 446, 447, 448, 553.1, 67.11, 455/414.1, 452.2, 456.5, 134, 277.2, 67.13; 370/328, 329, 332
See application file for complete search history.

(56) References Cited

U.S. PATENT DOCUMENTS

| 5,293,641 A | 3/1994 | Kallin et al. |
| 5,787,352 A | 7/1998 | Benveniste |

(Continued)

FOREIGN PATENT DOCUMENTS

| CN | 1138480 | 2/2013 |
| EP | 1119113 | 7/2001 |

(Continued)

OTHER PUBLICATIONS

"Non-Final Office Action", U.S. Appl. No. 13/197,151, Nov. 21, 2013, 29 pages.

(Continued)

*Primary Examiner* — Inder Mehra
(74) *Attorney, Agent, or Firm* — Sunah Lee; Kate Drakos; Micky Minhas

(57) ABSTRACT

Techniques for making channel assignments to reduce interference and increase capacity of wireless networks are described. In an implementation, a signal is received at a first station from a second station. A signal strength is measured and compared to other signal strength measurements of signals received from other stations. The signal strength is determined to be relatively weak based on the comparison, and the second station is assigned to a first subchannel that includes subcarriers reserved for stations with relatively weak signals. Subsequently, the signal strength measurement is repeated and the signal strength is determined to be relatively strong in comparison to the other signal strengths. The second station is then reassigned to a second subchannel that includes subcarriers reserved for stations with relatively strong signals.

20 Claims, 2 Drawing Sheets

(51) Int. Cl.
  H04Q 7/36     (2006.01)
  H04Q 7/32     (2006.01)
  H04Q 7/24     (2006.01)
  H04W 24/10    (2009.01)
  H04W 36/30    (2009.01)
  H04W 72/08    (2009.01)
  H04W 16/10    (2009.01)

(56) References Cited

U.S. PATENT DOCUMENTS

| | | | |
|---|---|---|---|
| 5,794,157 | A | 8/1998 | Haartsen |
| 5,884,145 | A | 3/1999 | Haartsen |
| 5,915,221 | A | 6/1999 | Sawyer et al. |
| 6,075,991 | A * | 6/2000 | Raleigh et al. ............ 455/450 |
| 6,175,734 | B1 | 1/2001 | Desgagne et al. |
| 6,388,999 | B1 | 5/2002 | Gorsuch et al. |
| 6,411,817 | B1 | 6/2002 | Cheng et al. |
| 6,711,415 | B1 | 3/2004 | McCarthy |
| 6,983,150 | B2 | 1/2006 | Dixon |
| 7,106,713 | B2 | 9/2006 | Pankaj |
| 7,257,376 | B2 | 8/2007 | Reudink |
| 7,474,895 | B1 | 1/2009 | Jiang et al. |
| 7,920,870 | B1 | 4/2011 | Bhatia et al. |
| 8,010,118 | B2 | 8/2011 | Reudink |
| 8,897,796 | B2 | 11/2014 | Reudink |
| 2001/0041574 | A1 | 11/2001 | Bergenlid et al. |
| 2002/0027957 | A1 | 3/2002 | Paulraj et al. |
| 2002/0072373 | A1 | 6/2002 | Muramoto et al. |
| 2002/0154705 | A1 | 10/2002 | Walton et al. |
| 2004/0127223 | A1 * | 7/2004 | Li et al. ............ 455/446 |
| 2005/0096061 | A1 * | 5/2005 | Ji et al. ............ 455/450 |
| 2005/0249322 | A1 | 11/2005 | Gerlach |
| 2006/0056360 | A1 | 3/2006 | Parkvall et al. |
| 2006/0135169 | A1 * | 6/2006 | Sampath et al. ............ 455/447 |
| 2006/0153283 | A1 * | 7/2006 | Scharf et al. ............ 375/148 |
| 2013/0170370 | A1 | 7/2013 | Reudink |

FOREIGN PATENT DOCUMENTS

| | | |
|---|---|---|
| IL | 187577 | 3/2013 |
| JP | 7245776 | 9/1995 |
| JP | 9037337 | 2/1997 |
| JP | 10308972 | 11/1998 |
| JP | 2001036463 | 2/2001 |
| JP | 2001339342 | 12/2001 |
| KR | 101258824 | 4/2013 |
| TW | I393456 | 4/2013 |
| WO | WO-9631075 | 10/1996 |
| WO | WO-9733377 | 9/1997 |
| WO | WO-9809465 | 3/1998 |
| WO | WO-2006107656 | 10/2006 |

OTHER PUBLICATIONS

"Foreign Office Action", CA Application No. 2,609,120, Feb. 3, 2014, 4 pages.
"Foreign Office Action", Canadian Application No. 2609120, (Mar. 28, 2013), 3 pages.
"Final Office Action", U.S. Appl. No. 13/197,151, (May 29, 2013), 26 pages.
"Extended European Search Report", EP Application No. 06772558.0, Mar. 31, 2011, 9 pages.
"Final Office Action", U.S. Appl. No. 13/197,151, Sep. 12, 2012, 19 pages.
"Final Office Action", U.S. Appl. No. 11/777,801, Oct. 1, 2010, 31 pages.
"Foreign Notice of Allowance", Israel Application No. 187577, Aug. 8, 2012, 2 pages.
"Foreign Notice of Allowance", Korean Application No. 10-2008-7002361, Jan. 25, 2013, 3 pages.
"Foreign Notice of Allowance", Chinese Application No. 200680023343.3, Nov. 6, 2012, 4 pages.
"Foreign Notice of Allowance", Taiwan Application No. 095122305, Dec. 12, 2012, 4 pages.
"Foreign Notice of Allowance", Japanese Application No. 2008-519329, Mar. 15, 2012, 6 pages.
"Foreign Office Action", Taiwan Application No. 095122305, Aug. 29, 2012, 10 pages.
"Foreign Office Action", Israel Application No. 187577, Nov. 23, 2011, 4 pages.
"Foreign Office Action", Korean Application No. 10-2008-7002361, Aug. 16, 2012, 6 pages.
"Foreign Office Action", JP Application No. 2008-519329, Nov. 2, 2011, 7 pages.
"Foreign Office Action", Chinese Application No. 200680023343.3, Jul. 20, 2012, 7 pages.
"Foreign Office Action", Chinese Application No. 200680023343.3, Mar. 26, 2012, 8 pages.
"IEEE 802.11a-1999", From Wikipedia, the free encyclopedia, downloaded from <http://en.wikipedia.org/wiki/IEEE_802.11a-1999> on Mar. 12, 2013, 5 pages.
"Initial OFDMA/OFDMA PHY proposal for the 802.16.3 BWA", Oct. 30, 2000, 21 pages.
"International Search Report & Written Opinion", Application No. PCT/US2006/022296, Apr. 10, 2008, 8 pages.
Wong, et al.,"Multiuser OFDM with Adaptive Subcarrier, Bit, and Power Allocation", IEEE Journal on Selected Areas in Communications, vol. 17, No. 10, Oct. 1999, pp. 1747-1758.
"Non-Final Office Action", U.S. Appl. No. 11/172,604, Oct. 6, 2006, 11 pages.
"Non-Final Office Action", U.S. Appl. No. 13/197,151, Jan. 9, 2012, 13 pages.
"Non-Final Office Action", U.S. Appl. No. 13/197,151, Jan. 2, 2013, 22 pages.
"Non-Final Office Action", U.S. Appl. No. 11/777,801, Feb. 17, 2010, 24 pages.
"Notice of Allowance", U.S. Appl. No. 11/777,801, May 23, 2011, 6 pages.
"Notice of Allowance", U.S. Appl. No. 11/172,604, Apr. 6, 2007, 8 pages.
"Notice of Allowance", U.S. Appl. No. 11/777,801, Apr. 20, 2011, 9 pages.
"Foreign Office Action", CA Application No. 2,609,120, Nov. 3, 2014, 5 Pages.
"Notice of Allowance", U.S. Appl. No. 13/197,151, Jul. 14, 2014, 11 pages.
"Non-Final Office Action", U.S. Appl. No. 13/714,183, Jul. 31, 2014, 21 pages.
"Notice of Allowance", U.S. Appl. No. 13/714,183, Jan. 16, 2015, 10 pages.

* cited by examiner

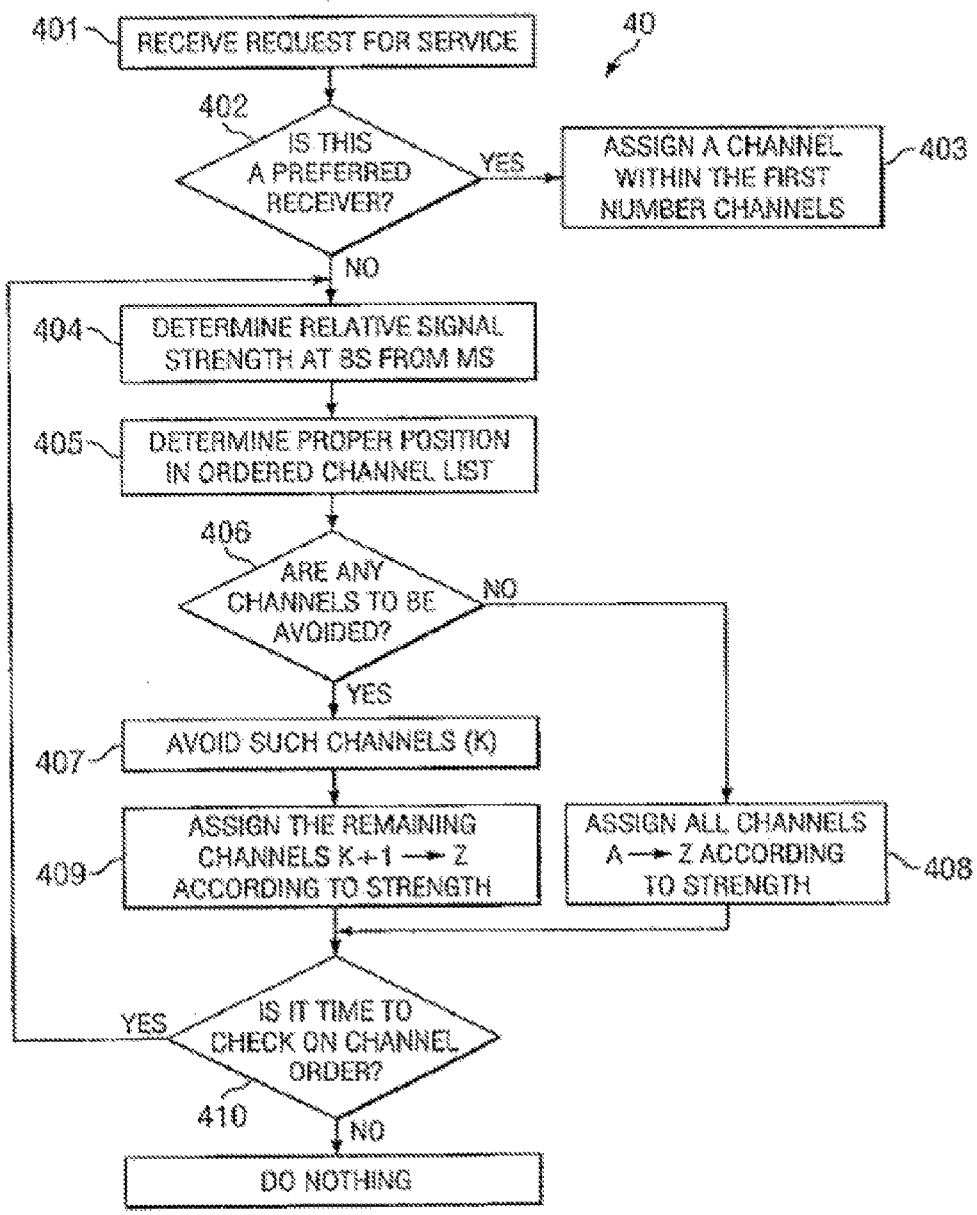

SYSTEMS AND METHODS FOR MAKING CHANNEL ASSIGNMENTS TO REDUCE INTERFERENCE AND INCREASE CAPACITY OF WIRELESS NETWORKS

CROSS-REFERENCE TO RELATED APPLICATIONS

This application is a continuation of, and claims priority to, pending U.S. patent application Ser. No. 13/197,151, filed Aug. 3, 2011, which is a continuation of U.S. Pat. No. 8,010,118, filed Jul. 13, 2007, which is a continuation of U.S. Pat. No. 7,257,376, filed Jun. 30, 2005, the entire disclosures of which are incorporated herein by reference.

TECHNICAL FIELD

This invention relates to wireless network channel assignments and more particularly to systems and methods for making such assignments in a manner to reduce interference and increase capacity in wireless networks.

BACKGROUND OF THE INVENTION

In wireless systems it is often desired to use all channels (or all of the allocated spectrums) in every cell. These systems are called N=1 reuse systems. In such systems it is possible for a mobile station (MS) to receive signals of equal power on the same channel from two base stations (BS).

Current methods of solving this problem include CDMA where different codes are transmitted by different BSs and, depending on the spreading factors, a signal can be extracted from the interference with greater reliability. Unfortunately, in such systems spreading reduces the overall through-put in direct proportion.

Another solution involves frequency hopping. In this case the BSs randomly select channels to send to the MS and if only a few mobiles are in use the chances of collisions can be made small because each channel is used only a small fraction of the time. However, as loading (increased MSs) increases, collision possibility increases until with 100% of possible users on at each BS collisions occur in every instance. The damage due to interference done at each instant depends upon the instantaneous transmitter power of the interfering BSs and the relative distances the MSs are from their respective BSs.

BRIEF SUMMARY OF THE INVENTION

There is disclosed a system and method for improving wireless system capacity by reducing collisions where the Signal to Interference Ratio (SIR) is high in systems having a channel reuse of 1. By intelligently assigning (ordering) the channel assignment in each of the interfering cells according to a pattern, for example, according to the distance from a BS, the MSs will become paired on the same channel in a manner to reduce interference between them. A second step is to optionally control the power of the BS and MS transmitter to further optimize user capacity or reduce interference.

In one embodiment, this intelligent assignment is accomplished by assigning MSs in one cell such that the MS having the strongest signal is assigned channel A while in the interfering cell, the MS with the weakest signal, is assigned to channel A. In another embodiment, certain preferred MSs are assigned either interference-free channels or channels paired with weak interference MSs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 2 shows one assignment pattern;

FIG. 4 shows one embodiment of an algorithm for assigning channels.

DETAILED DESCRIPTION OF THE INVENTION

Figure 1:
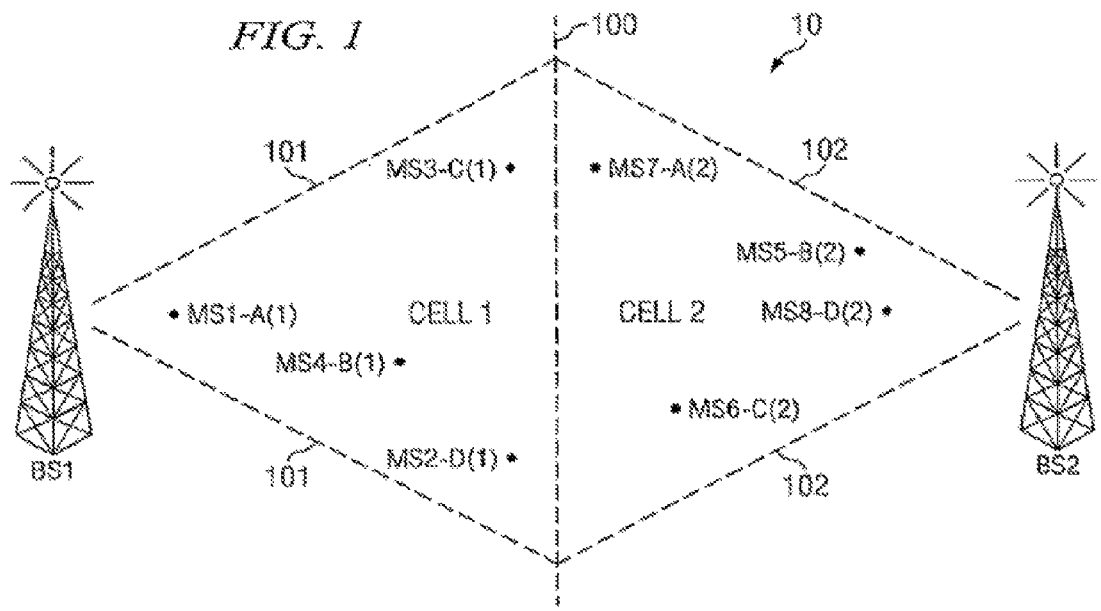
FIG. 1 shows one embodiment of wireless cells ordered according to a pattern.

FIG. 1 shows one embodiment 10 in which BS1 makes channel assignments for MSs from the nearest (strongest power levels) to the farthest (weakest power levels), while BS2 makes channel assignments to MSs from the farthest (weakest power levels) to the nearest (strongest power levels). This assignment pattern is shown in FIG. 2.

Using this channel assignment, pattern MS1-A(1) having a strong signal, is assigned channel A in cell 1. MS7 which is at the edge of cell 2, and has a relatively weak signal from BS2 is assigned the channel A in cell 2. This assignment avoids the situation where MS3 and MS7 are paired on the same channel. Were that to occur, S≈I for transmission in each direction from BS to MS and from MS to BS yielding high interference.

Each BS can make new channel assignments from time to time so that for the most part the MSs remain assigned according to their relative strength even though they are moving.

Intelligent assignments can be done in other ways to achieve different objectives. For example, some MSs can be designated as preferred users so that the preferred user will always be paired with the weakest interferer in every instance. For example, if MS4 was a preferred user it would be paired with MS7 in the example of FIG. 1.

Another objective may be to provide maximum capacity to a particular user. In such a case a clear channel could be guaranteed to the user or the user could be paired with the weakest user in the other cell.

Another objective may be to reduce interference in a cell by having a BS and/or selected MS transmit at a slower rate at reduced power.

The strategies discussed herein can be implemented at each BS without prior knowledge of the signals and interferences at the interfering BS. An alternative would be a centralized controller that has access to the signal levels and the interference levels of all MSs, and which then implements a centralized strategy, say to maximize the capacity of the entire network. In principle, a computer could evaluate every possible pairing combination and select from that a desired result such as maximum network capacity or minimizing high interference conditions.

Figure 3:
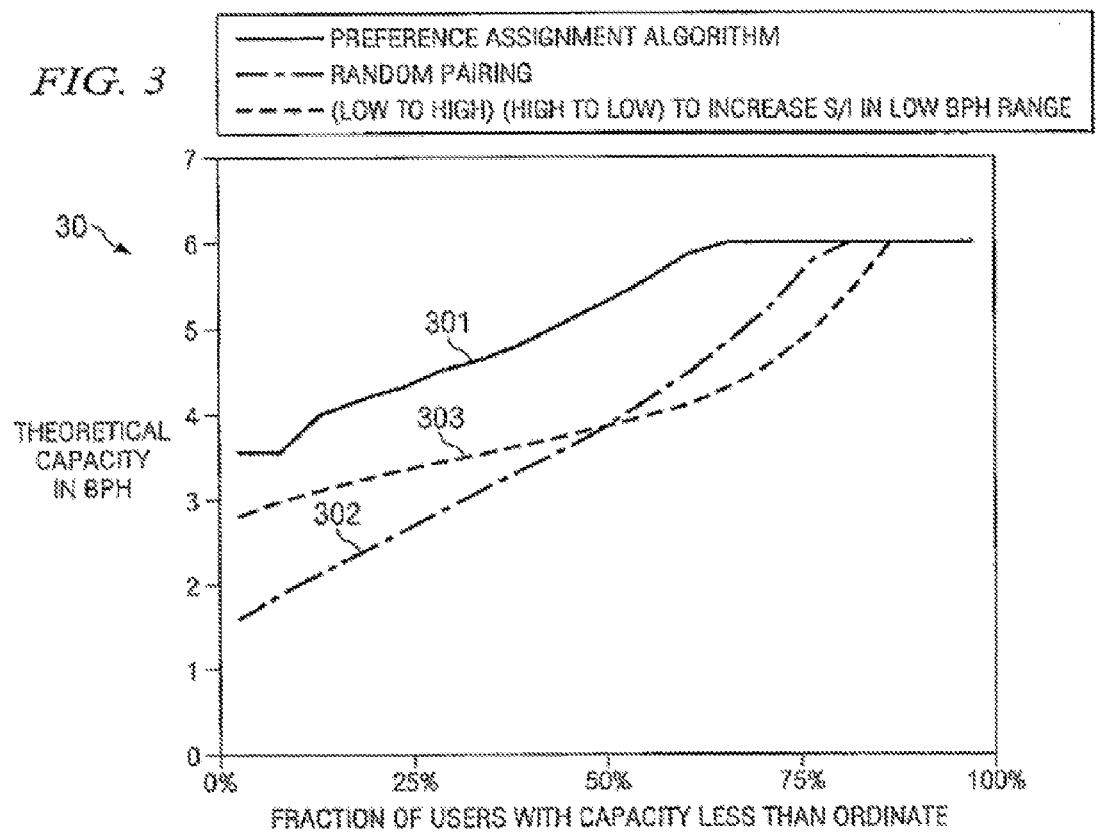
FIG. 3 shows a simulation of theoretical capacity distributions for random and intelligent channel assignment.

FIG. 3 shows simulation 30 of high to low ordering paired with the low to high (graph 303) at the interfering BS as shown in FIG. 2. Graphs 301, 302 and 303 represent the capacity distributions of the three strategies. For example, at the 25% point, this means 75% of all users enjoy capacities exceeding 4, 3 and 2.5 BPH respectively. Or looking the other way 25% of all users have capacity less than 4, 3 and 2.5 BPH. The results using 16 sub-carriers show increased bandwidth (theoretical capacity), i.e., a significant reduction in high interference events for a greater number of users over either the preference channel assignment method (graph 301) or random assignment (graph 302), all using 100% of the channels in both of the interfering cells. Note that using preference pairing (which can be a premium service available to select number of MSs) a higher capacity (graph 301) can be achieved, but for a lower number of MSs.

Graph 302 shows, for example, a typical OFDMA system where individual MS are assigned a subset of all the available sub-carriers. In a typical transmission slot the BS may have available 16, 32 or more sub-channels. A sub-channel usually has several sub-carriers, each carrying independent information. Normally, the sub-channels are assigned on a first come first serve basis to the mobile users who normally are randomly distributed within their respective cells.

Pairing using graph 303 can be changed, for example, as discussed above, every 5 MS, to be sure that in cell 1 the strongest station remains on channel A, while the weakest station is on channel D, while in cell 2 the weakest station is on channel A, while the strongest is on channel D. Strongest can be defined using any convenient metric so long as the potentially interfering cells agree on the metric. One example would be using high signal to interference ratios (SIR) as a measure of strength.

Using the preference assignment cell 1 would leave, say the first 5-10% of channels open for assignment to preferred customers, and would leave the last 5-10% of channels vacant. Cell 2 would do the reverse, i.e., leave its first 5-10% of channels vacant and assign its preferred customers to the last 5-10% of channels. Also, it could be established that preferred users would always get the weakest interferences from the other cell, as discussed above. Graph 301 was simulated for the case of the preferred user being paired with the weakest interferer (weakest one out of 16 at random locations).

FIG. 4 shows one embodiment 40 of a process for assigning channels in a wireless system. Process 401 controls requests for service from a MS (user) and process 402 optionally determines if the requesting user is a preferred user. If it is then process 403 assigns a channel according to a class of service or other identifying characteristic of the MS depending upon contractual arrangements with the user.

If the requesting user is not a preferred user then process 404 determines relative signal strength, as discussed above, and process 405, following an assignment pattern as shown in FIG. 2, assigns a proper channel in conjunction with processes 406, 407, 408 and 409 which check to be sure there is no prohibition on the use of certain channels (such as, for example, would occur if certain channels were to be maintained vacant).

Process 410 controls the reassignment from time to time of the channel assignments to insure that the pattern established by FIG. 2 is maintained, at least on the average.

In one embodiment the allocated spectrum is divided into channels. A channel is defined as a portion (may be all) of the allocated spectrum being used for a specified period of time. The inventive concepts apply to FDMA, TDMA, TD-CDMA, OFDMA or combinations thereof.

Note that the capacity of a BS or the capacities of certain MSs can be raised or lowered by trading power for throughput (capacity). A simple example: If a user needs less capacity, then lower the power and change the modulation rate.

$C=\log 2(1+S/N+I)$. Reduce $S$ to $\frac{1}{4}S$ and the new $C=\frac{1}{2}$ the old $C$.

Increase S to 4 S and the new C is doubled.

This is a tradeoff. Every time the BS lowers power it helps the neighbor cell, but if it increases power to certain MS it causes more interference. However, if the channels that are increased in power are part of the reserved set, then it may not matter.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving at a first station a signal from a second station;
measuring signal strength of the signal to produce a first measurement;
comparing the first measurement to one or more other signal strength measurements of signals received from one or more other stations to provide a first comparison;
determining that the received signal strength of the signal is relatively weak based on the first comparison;
assigning the second station to a first subchannel comprising a plurality of OFDMA subcarriers selected from a first set of subcarriers reserved for stations with relatively weak signals based on the determination that the received signal is relatively weak, the first subchannel formed by the plurality of OFDMA subcarriers for a predetermined period of time;
after expiration of a duration of time, repeating the measuring of the signal strength of the signal to produce a second measurement;
responsive to repeating the measuring of the signal strength, providing a second comparison by comparing the second measurement to the one or more other signal strength measurements of the signals received from the one or more other stations;

determining that the received signal strength of the signal is relatively strong based on the second comparison; and reassigning the second station to a second subchannel comprising a plurality of subcarriers selected from a second set of subcarriers reserved for stations with relatively strong signals based on the determination that the received signal strength of the signal is relatively strong, the second station being reassigned to the second subchannel subsequent to a determination that no prohibition exists that is associated with the second subchannel.

2. The method of claim 1, wherein the first station comprises a base station and the second station comprises a mobile station.

3. The method of claim 1, wherein the signal includes a request for a channel assignment.

4. The method of claim 1, further comprising causing a change to a transmit modulation rate of the second station for the second subchannel.

5. The method of claim 1, wherein one or more of the first measurement or the second measurement is based on a signal-to-interference ratio of the signal.

6. The method of claim 1, further comprising dividing a full set of subcarriers available for assignment into at least the first set of subcarriers reserved for stations with relatively weak signals and the second set of subcarriers reserved for stations with relatively strong signals.

7. The method of claim 1, wherein the second measurement is different than the first measurement based on a change of location of the second station.

8. A method comprising:

transmitting, by a mobile station, a first signal to a first base station;

receiving at the mobile station a first subchannel assignment, the first subchannel assignment corresponding to a first subchannel that comprises a plurality of OFDMA subcarriers selected from a first set of subcarriers reserved for stations with relatively weak signals compared to signals sent to the first base station from one or more other stations in a first cell, the first subchannel assignment being based on a determination that the first signal is relatively weak in comparison to the signals from the one or more other stations;

transmitting, by the mobile station, a second signal to a second base station, the second signal and the first signal being different in signal strength based on at least a difference between a distance the mobile station to the first base station and a distance from the mobile station to the second base station; and receiving, at the mobile station and from the second base station, a second subchannel assignment, the second subchannel assignment corresponding to a second subchannel that comprises a plurality of subcarriers selected from a second set of subcarriers reserved for stations with relatively strong signals in comparison to signals sent to the second base station from one or more additional stations in a second cell adjacent to the first cell, the second subchannel assignment being based on a determination that the second signal is relatively strong in comparison to the signals from the one or more additional stations.

9. The method of 8, wherein the first base station is associated with the first cell, wherein the second base station is associated with the second cell, wherein one or more signals in the first cell interfere with one or more signals in the second cell.

10. The method of claim 8, further comprising requesting by the mobile station the first subchannel assignment from the first base station and requesting the second subchannel assignment from the second base station.

11. The method of claim 8, further comprising causing a transmit modulation rate of the mobile station to be adjusted.

12. The method of claim 8, wherein the first subchannel assignment is based at least in part on an interference level of the one or more additional stations in the second cell.

13. The method of claim 8, wherein the second subchannel assignment is based at least in part on an interference level of the signals from the one or more other stations in the first cell.

14. The method of claim 8, further comprising dividing a full set of subcarriers available for assignment into at least the first set of subcarriers reserved for stations with relatively weak signals and the second set of subcarriers reserved for stations with relatively strong signals.

15. A computing device comprising hardware configured to:

receive a signal from a mobile station in a first cell;

measure a signal strength of the signal to produce a first measurement;

compare the first measurement to one or more other signal strength measurements of signals received from one or more other stations in the first cell to provide a first comparison;

determine that the received signal strength of the signal is relatively weak based on the first comparison;

assign the mobile station to a first subchannel comprising a plurality of OFDMA subcarriers selected from a first set of subcarriers reserved for stations with relatively weak signals based on the determination that the received signal is relatively weak, the first subchannel formed by the plurality of OFDMA subcarriers for a predetermined period of time;

after expiration of a duration of time, re-measure the signal strength of the signal to produce a second measurement;

responsive to the signal strength being re-measured, compare the second measurement to the one or more other signal strength measurements of the signals received from the one or more other stations in the first cell to provide a second measurement;

determine that the received signal strength of the signal is relatively strong based on the second comparison; and responsive to the determination that the received signal strength of the signal is relatively strong, determining that no prohibition exists that is associated with a second subchannel comprising a plurality of subcarriers selected from a second set of subcarriers reserved for stations with relatively strong signals, and reassigning the mobile station to the second subchannel.

16. The computing device of claim 15, wherein the second measurement of the signal strength is different than the first measurement of the signal strength based on a change of location of the computing device.

17. The computing device of claim 15, wherein the first measurement and the second measurement are based at least in part on a signal-to-interference ratio of the signal.

18. The computing device of claim 15, wherein the hardware is further configured to divide a full set of subcarriers available for assignment into at least the first set of subcarriers reserved for stations with relatively weak signals and the second set of subcarriers reserved for stations with relatively strong signals.

19. The computing device of claim 15, wherein the signal includes a request for channel assignment.

20. The computing device of claim 15, wherein the hardware is further configured to cause a change to a transmit modulation rate of the second station for the second subchannel.

\* \* \* \* \*